US010875461B2

(12) United States Patent
Salter et al.

(10) Patent No.: US 10,875,461 B2
(45) Date of Patent: Dec. 29, 2020

(54) TIE-DOWN BRACKET FOR MOTOR VEHICLE

(71) Applicant: Ford Global Technologies, LLC, Dearborn, MI (US)

(72) Inventors: Stuart C. Salter, White Lake, MI (US); David Brian Glickman, Southfield, MI (US); Paul Kenneth Dellock, Northville, MI (US); Kevin Berington Johnson, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/424,838

(22) Filed: May 29, 2019

(65) Prior Publication Data

US 2020/0377028 A1 Dec. 3, 2020

(51) Int. Cl.
| | |
|---|---|
| *B60R 9/048* | (2006.01) |
| *B60R 9/08* | (2006.01) |
| *F21V 21/40* | (2006.01) |
| *F21V 23/04* | (2006.01) |
| *B60Q 1/50* | (2006.01) |
| *B60R 11/06* | (2006.01) |
| *B60Q 7/02* | (2006.01) |
| *F21Y 115/10* | (2016.01) |
| *B60R 11/00* | (2006.01) |

(52) U.S. Cl.
CPC ............... *B60R 9/048* (2013.01); *B60Q 1/50* (2013.01); *B60Q 7/02* (2013.01); *B60R 9/08* (2013.01); *B60R 11/06* (2013.01); *F21V 21/406* (2013.01); *F21V 23/0428* (2013.01); *B60R 2011/004* (2013.01); *F21Y 2115/10* (2016.08)

(58) Field of Classification Search
CPC ................. B60Q 3/59; B60Q 1/2661
USPC ........................................... 362/486
See application file for complete search history.

(56) References Cited

U.S. PATENT DOCUMENTS 2,635,796 A * 4/1953 Davolt ................. B60R 9/00
224/42.31
3,332,119 A * 7/1967 Sherwood ............ B60P 3/1025
24/131 R (Continued)

FOREIGN PATENT DOCUMENTS

| CN | 203172547 U | 9/2013 |
|---|---|---|
| CN | 106122816 A | 11/2016 |

(Continued)

OTHER PUBLICATIONS

Amazon.com, "Deuce-Style Dual LED White Amber Running Light Turn Signal Smoke Lens (1157 Bulb, White Amber LED)" Automotive. Downloaded from https://www.amazon.com/Deuce-Style-White-Amber-Running-Signal/dp/B079QLYHJ4/ref=sr_1_fkmmull_1?keywords=Deuce+style+dual+LED+white+amber+running+light+turn+signal+smoke+lens&qid=1557770419&s=gateway&sr=8-1-fkmmull on Apr. 4, 2019.

(Continued)

*Primary Examiner* — Scott T McNurlen
(74) *Attorney, Agent, or Firm* — David Coppiellie; Carlson, Gaskey & Olds, P.C.

(57) ABSTRACT

This disclosure relates to a tie-down bracket for a motor vehicle. The tie-down bracket includes a base portion and a removable portion configured to selectively attach to and detach from the base portion. The removable portion is operable as a flashlight when detached from the base portion. A method is also disclosed.

19 Claims, 8 Drawing Sheets

(56) References Cited

U.S. PATENT DOCUMENTS

| | | | |
|---|---|---|---|
| 4,621,753 A * | 11/1986 | Ridings | A45F 5/02 |
| | | | 224/234 |
| 4,819,139 A | 4/1989 | Thomas | |
| 5,077,643 A | 12/1991 | Leach | |
| 5,641,106 A | 6/1997 | Slaughter et al. | |
| 5,685,470 A * | 11/1997 | Moore | B60R 7/005 |
| | | | 224/567 |
| 6,079,858 A * | 6/2000 | Hicks | B60Q 1/2665 |
| | | | 362/276 |
| 7,055,973 B2 * | 6/2006 | Englander | B60R 1/0605 |
| | | | 248/479 |
| 8,057,081 B2 | 11/2011 | Schwab | |
| 8,167,180 B2 | 5/2012 | Bogoslofski et al. | |
| 8,469,558 B2 | 6/2013 | Carmi | |
| 8,505,794 B2 * | 8/2013 | Ardigo | B60R 7/08 |
| | | | 224/543 |
| 8,561,864 B2 * | 10/2013 | Gisin | B60R 9/04 |
| | | | 224/309 |
| 9,969,232 B2 | 5/2018 | Salter et al. | |
| 2006/0226188 A1 | 10/2006 | Smith | |
| 2011/0149560 A1 | 6/2011 | Jessup et al. | |
| 2011/0182062 A1 * | 7/2011 | Wilson | F21V 15/04 |
| | | | 362/197 |
| 2011/0192857 A1 * | 8/2011 | Rothbaum | F16M 11/041 |
| | | | 220/694 |
| 2011/0249430 A1 * | 10/2011 | Stamatatos | B60Q 7/00 |
| | | | 362/184 |
| 2013/0249252 A1 | 9/2013 | Schmid et al. | |
| 2014/0160776 A1 * | 6/2014 | Sura | B60Q 3/30 |
| | | | 362/485 |
| 2015/0049500 A1 * | 2/2015 | Sakarian | F21L 4/08 |
| | | | 362/486 |

FOREIGN PATENT DOCUMENTS

| | | | | |
|---|---|---|---|---|
| FR | 2592133 A3 | | 6/1987 | |
| JP | 2005082134 A | * | 3/2005 | B60Q 3/225 |

OTHER PUBLICATIONS

Abell Hobby, Realistic 1/10 Front Bumper with LED Lights & Towing Hooks for SCX-10 40mm Mount (C25539SILVERBLACK), Downloaded from https://www.abellhobby.com/Realistic-1-10-Front-Bumper-with-LED-Lights-p/intc25539silverblack.htm on Apr. 4, 2019.

Oliver, J. Brent, "Hooked On My Escape," Downloaded from www.hookedonmyescape.com on Apr. 4, 2019. Copyright 2012-2015.

Oak Orchard Canoe Kayak Experts, "Wonder Bar Roof Rack," Downloaded from https://www.oakorchardcanoe.com/wonderbar.php on Apr. 4, 2019. Copyright 1999-2019.

* cited by examiner

TIE-DOWN BRACKET FOR MOTOR VEHICLE

TECHNICAL FIELD

This disclosure relates to a tie-down bracket for a motor vehicle.

BACKGROUND

Users often transport items such as luggage, canoes, kayaks, bicycles, skis, etc., by securing them to the roof of a vehicle. Such items may be secured to the roof using tie-downs.

SUMMARY

A vehicle assembly according to an exemplary aspect of the present disclosure includes, among other things, a tie-down bracket including a base portion and a removable portion configured to selectively attach to and detach from the base portion. The removable portion is operable as a flashlight when detached from the base portion.

In a further non-limiting embodiment of the foregoing vehicle assembly, when the removable portion is attached to the base portion, the tie-down bracket provides an opening configured to receive a tie-down.

In a further non-limiting embodiment of any of the foregoing vehicle assemblies, the removable portion includes a first section including a light and a second section including a handle.

In a further non-limiting embodiment of any of the foregoing vehicle assemblies, the first section extends in a direction substantially normal to the second section.

In a further non-limiting embodiment of any of the foregoing vehicle assemblies, a body of a vehicle includes at least one stud, and a groove configured to receive the stud is formed in an end of the first section.

In a further non-limiting embodiment of any of the foregoing vehicle assemblies, the stud and groove are arranged such that (1) when the removable portion is rotated out of alignment with the base portion the stud permits vertical movement of the removable portion and (2) when the removable portion is aligned with the base portion the stud restricts vertical movement of the removable portion.

In a further non-limiting embodiment of any of the foregoing vehicle assemblies, the base portion includes an actuator with a selectively moveable pin, and a recess configured to receive the pin is formed in an end of the second section.

In a further non-limiting embodiment of any of the foregoing vehicle assemblies, the handle includes a switch configured to selectively turn the light on and off.

In a further non-limiting embodiment of any of the foregoing vehicle assemblies, when the removable portion is attached to the base portion, the removable portion is electronically connected to a vehicle.

In a further non-limiting embodiment of any of the foregoing vehicle assemblies, when the removable portion is attached to the base portion, a battery of the removable portion is configured to charge.

In a further non-limiting embodiment of any of the foregoing vehicle assemblies, when the removable portion is attached to the base portion, a light of the removable portion faces in a rearward direction and is visible from inside a vehicle.

In a further non-limiting embodiment of any of the foregoing vehicle assemblies, the light provides one of a turn signal indicator, a battery state of charge indicator, a battery charging status indicator, and an auxiliary light.

In a further non-limiting embodiment of any of the foregoing vehicle assemblies, the removable portion includes one or both of a personal locator beacon and an avalanche beacon.

In a further non-limiting embodiment of any of the foregoing vehicle assemblies, the removable portion includes one or both of a wireless repeater and a wireless antenna.

In a further non-limiting embodiment of any of the foregoing vehicle assemblies, the removable portion includes a chirper.

A method according to an exemplary aspect of the present disclosure includes, among other things, removing a removable portion from a base portion of a tie-down bracket, and operating the removable portion as a flashlight.

In a further non-limiting embodiment of the foregoing method, the method includes attaching the removable portion to the base portion to define an opening.

In a further non-limiting embodiment of any of the foregoing methods, the method includes passing a tie-down through the opening.

In a further non-limiting embodiment of any of the foregoing methods, when the removable portion is attached to the base portion, the method includes operating a light of the removable portion as one of a turn signal indicator, a battery state of charge indicator, a battery charging status indicator, and an auxiliary light.

In a further non-limiting embodiment of any of the foregoing methods, a handle of the removable portion includes a switch, and the step of operating the removable portion as a flashlight includes pressing the switch while the removable portion is removed from the base portion.

BRIEF DESCRIPTION OF THE DRAWINGS

In FIG. 9, the removable portion is rotated out of alignment with a base portion of the tie-down bracket.

DETAILED DESCRIPTION

This disclosure relates to a tie-down bracket for a motor vehicle. The tie-down bracket includes a base portion and a removable portion configured to selectively attach to and detach from the base portion. The removable portion is operable as a flashlight when detached from the base portion. In at least this way, the tie-down bracket is multifunctional. These and other benefits will be appreciated from the below description.

Figure 1:
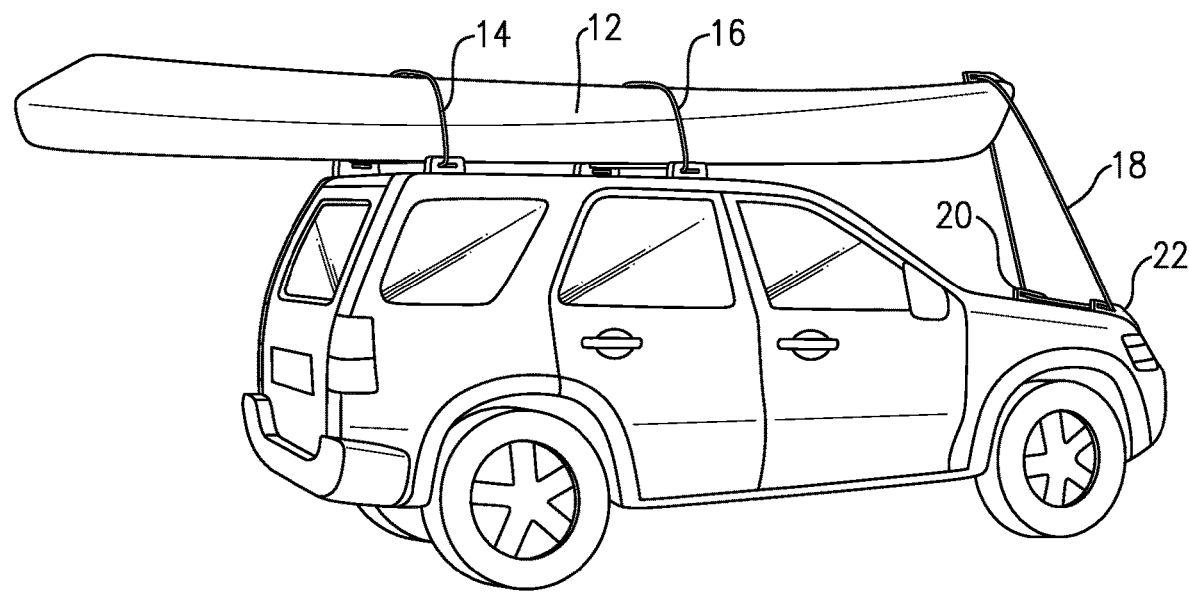
FIG. 1 is a rear-perspective view of a motor vehicle with an item secured to a roof.

Referring to the drawings, FIG. 1 is a rear-perspective view of a motor vehicle 10. While an SUV is pictured in FIG. 1, this disclosure is also applicable to other types of vehicles. In FIG. 1, an item 12, which in this example is a kayak, is secured to a roof of the vehicle 10 using tie-downs, such as ropes, cables, straps, cords, etc. In this example, there are three tie-downs 14, 16, 18 holding the item 12 in place. First and second tie-downs 14, 16 are connected to a roof rack of the vehicle 10. The front tie-down 18 is connected to a body of the vehicle 10 by way of first and second tie-down brackets 20, 22. While two tie-down brackets 20, 22 are shown in FIG. 1, it should be understood that this disclosure extends to vehicles with one or more tie-down brackets. The detail of one of the tie-down brackets will be described below, however it should be understood that first and second tie-down brackets 20, 22 are substantially identical.

Figure 2:
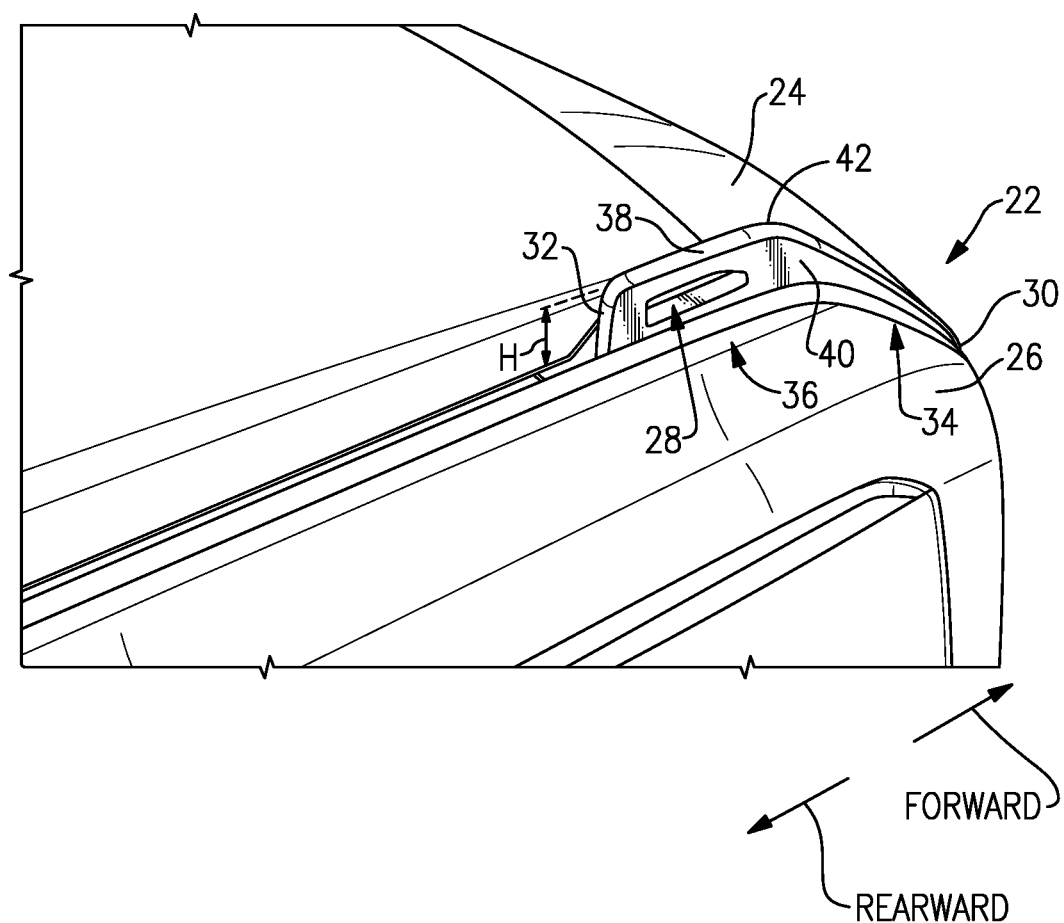
FIG. 2 is a rear-perspective view of an example tie-down bracket.
Figure 3:
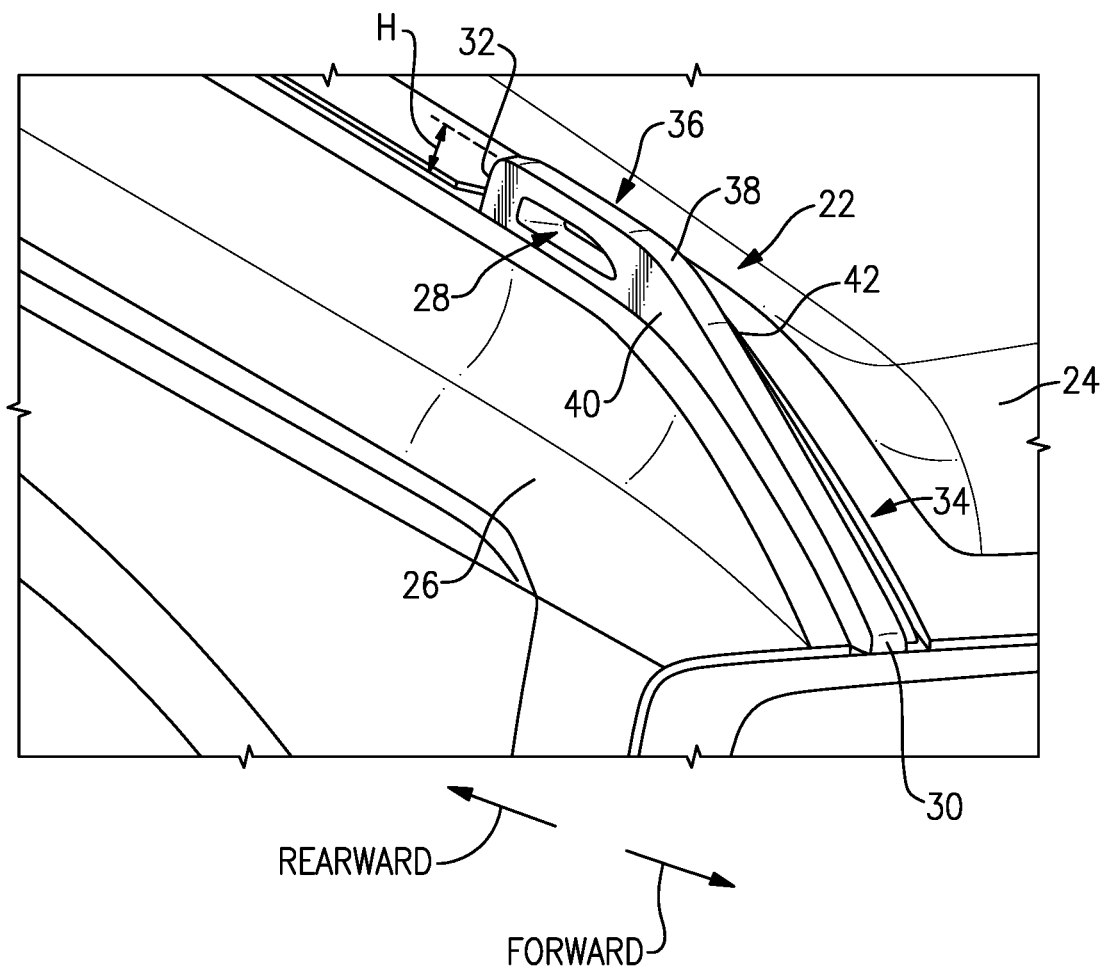
FIG. 3 is a front-perspective view of the tie-down bracket.

FIGS. 2 and 3 illustrate the tie-down bracket 22 in more detail. The "forward" and "rearward" directions are labeled in FIGS. 2 and 3 for ease of reference. The "forward" and "rearward" directions correspond to the normal "forward" and "rearward" orientations of the vehicle 10.

In this example, the tie-down bracket 22 is arranged in a space between a hood 24 and a front quarter panel 26 of the vehicle 10. It should be understood that the tie-down bracket 22 may be arranged in other locations, however. When the hood 24 is closed, as in FIGS. 2 and 3, the tie-down bracket 22 projects above the hood 24 and the front quarter panel 26. The tie-down bracket 22 includes an opening 28 configured to receive a tie-down, such as tie-down 18.

The tie-down bracket 22 includes a body, which may be a one-piece or multi-piece body, having a front surface 30 and a rear surface 32. In this example, the front surface 30 is substantially coterminous with a front of the hood 24 and a front of the front quarter panel 26. A length dimension of the tie-down bracket 22 extends between the front surface 30 and the rear surface 32, and further extends substantially parallel to a vehicle centerline. The opening 28 extends through the tie-down bracket 22 in a direction substantially normal to the vehicle centerline and to the length dimension of the tie-down bracket 22.

The tie-down bracket 22, in this example, includes a forward section 34 adjacent the front surface 30 and a rear section 36 adjacent the rear surface 32. The opening 28 is provided in the rear section 36, in this example. Further, the forward section 34 and the rear section 36 are inclined relative to one another, in this example. In particular, the rear section 36 is substantially parallel to a ground surface, and the front section 34 is inclined such that the tie-down bracket 22 slopes toward the ground surface approaching the front surface 30.

The tie-down bracket 22 includes a superior (i.e., top) surface 38 extending between a lateral (i.e., outer side) surface 40 and a medial (i.e., inner side) surface 42. The tie-down bracket 22 projects above the hood 24 when the hood 24 is closed by a height dimension H. The height dimension H extends from a top of the hood 24 to the superior surface 38. The height dimension H is substantially constant along the rear section 36. The height dimension H gradually reduces in dimension throughout the front section 34 approaching the front surface 30.

Figure 4:
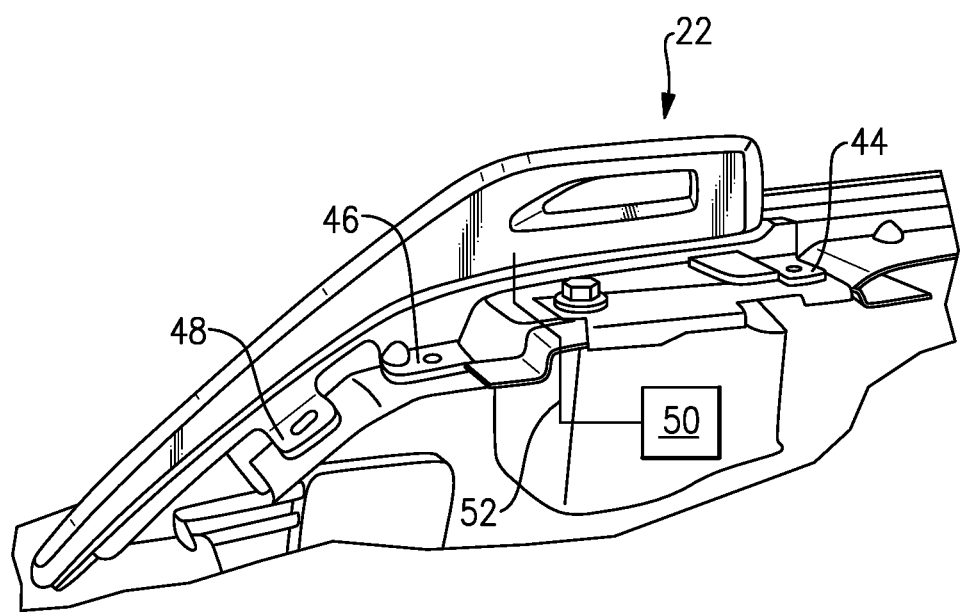
FIG. 4 is a front-perspective view of the tie-down bracket with a hood of the vehicle removed for ease of reference.

FIG. 4 is a side-perspective view of the tie-down bracket 22 with the hood 24 removed for ease of reference. In this example, the tie-down bracket 22 includes a plurality of tabs 44, 46, 48 configured to attach to a body of the vehicle 10 beneath the hood 24. The body may include a reinforced catwalk structure in the location of the tabs 44, 46, 48. The tabs 44, 46, 48 may include openings configured to receive fasteners, such as bolts.

In an aspect of this disclosure, the tie-down bracket 22 is selectively removable and/or replaceable. In particular, a user could selectively remove the tie-down bracket 22 and replace it with another type of tie-down bracket. Such tie-down brackets may be aftermarket accessories or included on the factory model of the vehicle 10.

The tie-down bracket 22, in this example, includes a base portion and a removable portion configured to selectively attach to and detach from the base portion. The removable portion includes at least one light which serves at least two functions, in this example. For instance, and as will be discussed in more detail below, when the removable portion is removed from the base portion, the removable portion is operable as a flashlight. Further, when the removable portion is attached base portion, the light is visible by the driver and may be configured to provide information about the vehicle.

The tie-down bracket 22 is in electronically connected to a controller 50. The controller 50 is illustrated schematically in FIG. 4. It should be understood that the controller 50 could be part of an overall vehicle control module, such as a vehicle system controller (VSC), or may be part of a body control module (BCM). Alternatively, the controller 50 may be a stand-alone controller separate from the VSC and the BCM. Further, the controller 50 may be programmed with executable instructions for interfacing with and operating the various components of the vehicle 10. The controller 50 additionally includes a processing unit and non-transitory memory for executing the various control strategies and modes of the vehicle system.

In this example, the controller 50 is electronically connected to various components of the tie-down bracket 22, including actuators, charging ports, lights, etc., via an interface 52. The interface 52 is shown schematically in FIG. 4, and is representative of a controller area network (CAN), a local interconnect network (LIN), or a wireless connection such as a Bluetooth® low energy (BLE) connection. A user may be permitted to provide inputs to the controller 50 via a human-machine interface, such as a mobile phone or an infotainment system of the vehicle 10. In that example, the interface 52 is connected to the human-machine interface as well.

Figure 5:
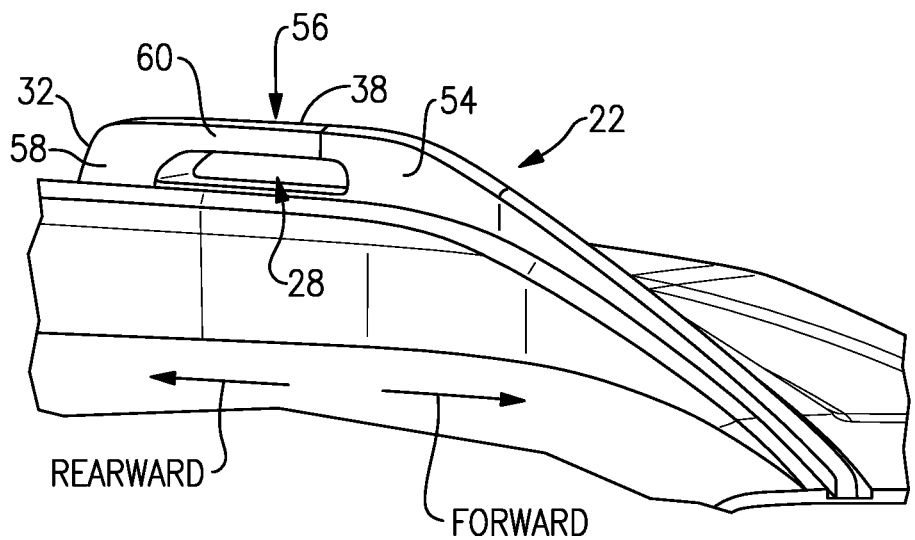
FIG. 5 is a side view of the tie-down bracket.

FIG. 5 illustrates further detail of the example tie-down bracket 22. As shown in FIG. 5, the tie-down bracket 22 includes a base portion 54 and a removable portion 56 configured to selectively attach to and detach from the base portion 54. The base portion 54 is rigidly connected to the body of the vehicle 10, as generally shown and described relative to FIG. 4. The removable portion 56 is configured to perform a plurality of functions. In particular, the removable portion 56 is operable as a flashlight when detached from the base portion 54. When attached to the base portion 54, as in FIG. 5, the removable portion 56 forms part of the tie-down bracket 22, and in particular defines a portion of the opening 28.

In the example of FIG. 5, the removable portion 56 includes a first section 58 and a second section 60. The first section 58 and second section 60 are arranged substantially perpendicular to one another. In particular, a length dimension of the first section 58 extends in a vertical direction (i.e., parallel to the height dimension H, which is generally up-and-down, relative to FIG. 5), and a length dimension of the second section 60 extends in a direction parallel to the forward and rearward directions.

With reference to FIG. 5, the first section 58 includes the rear surface 32 and extends to a rearward perimeter of the opening 28. The first section 58 projects above the hood 24 by the height dimension H to the superior surface 38. A portion of the first section 58 extends beneath the second section 60, such that the removable portion 56 generally resembles an L-shape. The second section 60 extends in the forward direction from the first section 58 and includes the superior surface 38 at locations vertically above the opening 28. Further, the second section 60 defines at least a portion of an upper perimeter of the opening 28.

Figure 6:
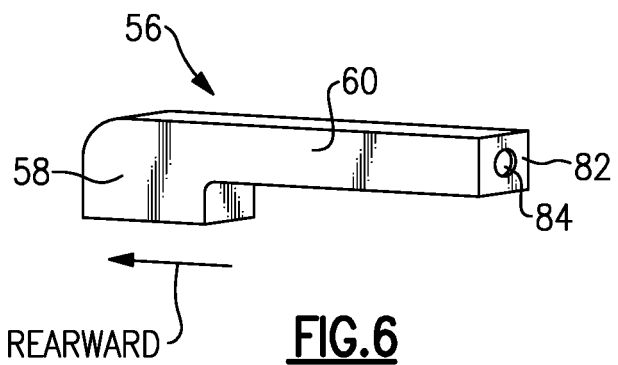
FIG. 6 is a side-perspective view of a removable portion of the tie-down bracket.
Figure 7:
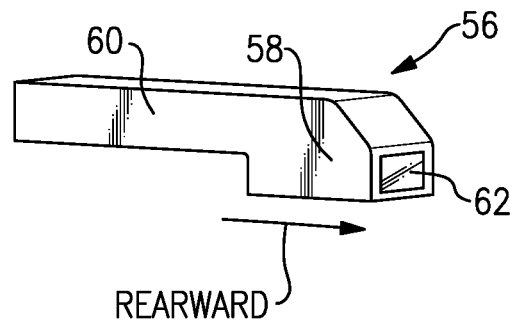
FIG. 7 is another side-perspective view of the removable portion.

FIGS. 6 and 7 illustrate the removable portion 56 in more detail. In FIGS. 6 and 7, the removable portion 56 is removed from the base portion 54. As shown, the first section 58 includes a light 62 and the second section 60 serves as a handle. The light 62 is rear-facing and is visible from inside the vehicle 10 when the removable portion 56 is attached to the base portion 54. The light 62 may be a light emitting diode (LED). The light 62 may also be a screen and in particular may be configured to display numbers, letters, and symbols. When the removable portion 56 is attached to the base portion 54, the light 62 may be selectively activated by the controller 50. When removed from the base portion 54, the light 62 may be selectively activated by a button or switch in the second section 60.

Figure 8:
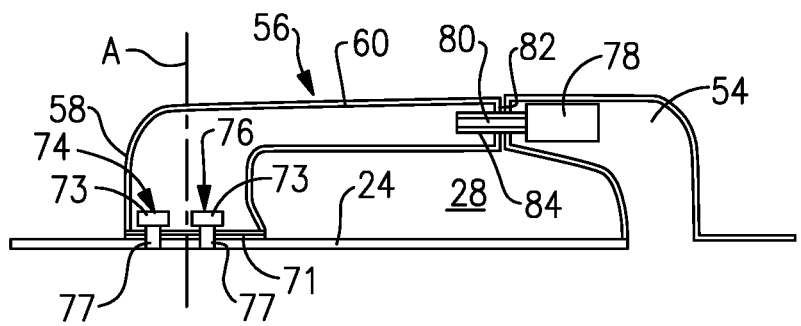
FIG. 8 is a somewhat schematic, partial cross-sectional view of the tie-down bracket arranged relative to a body of the vehicle.

FIG. 8 is a schematic, cross-sectional view of a portion of the tie-down bracket 22, and in particular is representative of the manner in which the base portion 54 and removable portion 56 are selectively connected together. In this example, the first and second sections 58, 60 each include features configured to connect the removable portion 56 to the base portion 54 and/or the body of the vehicle 10.

Figure 9:
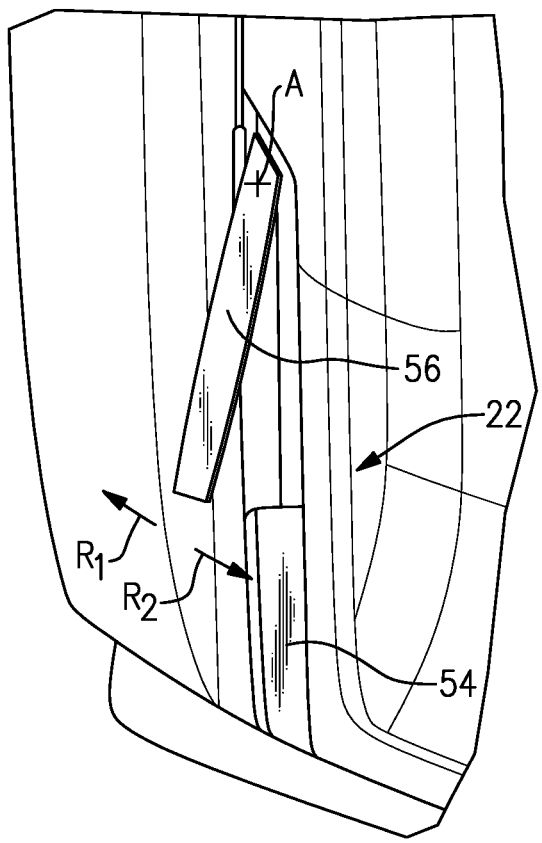
FIG. 9 is a top view of the tie-down bracket.

In one example of this disclosure, the removable portion 56 is configured to rotate relative to the base portion 54. Specifically, the removable portion 56 is rotatable laterally and medially, in directions $R_1$ and $R_2$, respectively, about a rotation axis A, which extends through the first section 58 generally in-and-out of the page, relative to FIG. 9.

Figure 10:
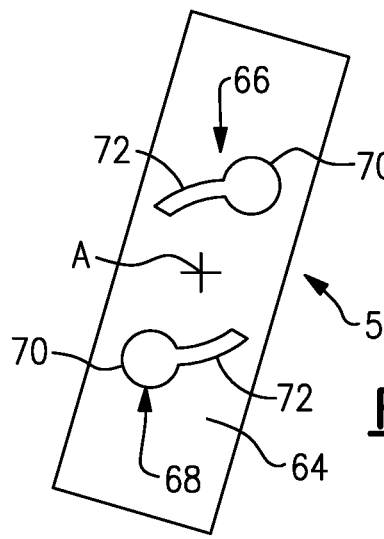
FIG. 10 is a view of an end of a first section of the removable portion.

In this example, an end of the first section 58 includes at least one groove formed therein. The at least one groove is configured to receive at least one stud projecting from a body of the vehicle 10. In a particular example, as shown in FIG. 10, an end 64 of the first section 58 includes a first groove 66 and a second groove 68, each of which include an enlarged section 70 and a narrow section 72. The end 64 may also include a layer 71 (FIG. 8) configured to resist wear and/or dampen vibrations between the end 64 and the body of the vehicle 10. The layer 71 may be a nylon or rubber material.

In this example, the enlarged sections 70 correspond in size to heads 73 of a corresponding first and second stud 74, 76 projecting from a body of the vehicle 10, and the narrow sections 72 correspond in size to shafts 77 of the studs 74, 76. The grooves 66, 68 and studs 74, 76 are arranged such that when the removable portion 56 is rotated in direction $R_1$ out of alignment with the base portion 54, as in FIG. 9, the removable portion 56 may be removed from the base portion 54 by lifting the removable portion 56 vertically. Specifically, when in the position of FIG. 9, the studs 74, 76 are received in the grooves 66, 68 and are aligned with the enlarged sections 70, and thus the relative position of the grooves 66, 68 and the studs 74, 76 permits vertical movement of the removable portion 56. On the other hand, when the removable portion 56 is aligned with the base portion 54 (i.e., relative to FIG. 9, the removable portion 56 is rotated back in the direction $R_2$), the studs 74, 76 are received in the grooves 66, 68 and are aligned with the narrow sections 72, and thus the studs 74, 76 restrict vertical movement of the removable portion 56.

While two grooves 66, 68 and studs 74, 76 are shown, this disclosure extends to arrangements with one or more grooves/studs. This disclosure extends to other arrangements in which a removable portion is selectively attachable relative to a base portion, and is not limited to removable portions that are rotatable relative to a base portion. Further, while the arrangement of the grooves and studs could essentially be reversed such that the studs are arranged in the removable portion and the grooves are arranged in the vehicle body.

In a further aspect of this disclosure, the base portion 54 includes an actuator 78 configured to selectively move a pin 80 into engagement with the removable portion 56. Specifically, an end 82 of the second section 60 includes a recess 84 (FIG. 6) configured to receive the pin 80 when the base portion 54 and the removable portion 56 are aligned with one another, as shown in FIG. 8. Together, the arrangement of the grooves 66, 68, studs 74, 76, pin 80, and recess 84 securely holds the removable portion 56 in place such that the tie-down bracket 22 can secure the item 12. Again, while an example arrangement is shown, this disclosure extends to other arrangements for holding the removable portion in place relative to the base portion.

Figure 11:
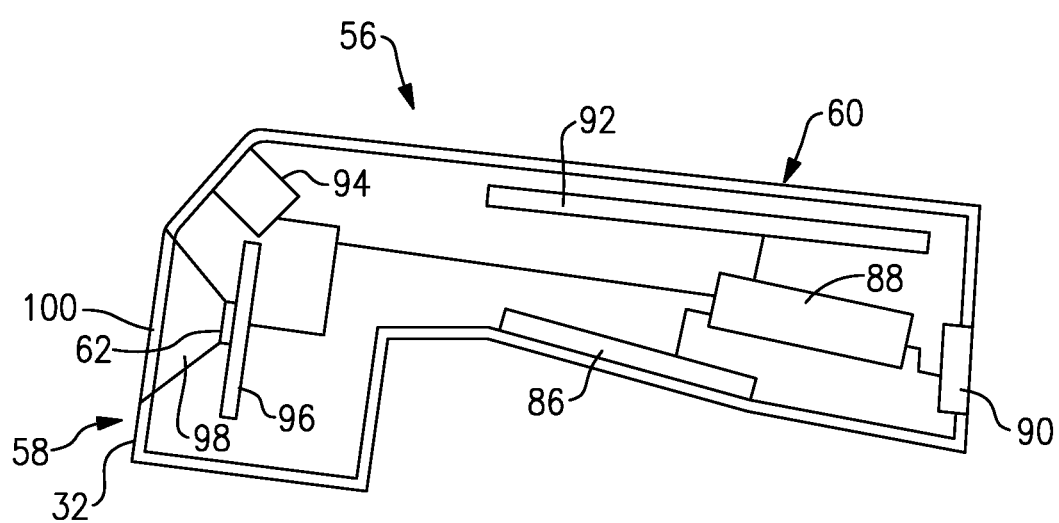
FIG. 11 is a somewhat schematic, cross-sectional view of the removable portion.

FIG. 11 is a schematic, cross-sectional view of the removable portion 56. As shown in FIG. 11, the removable portion 56 includes a switch 86 configured to selectively turn the light 62 on and off by selectively directing power from a battery 88 to the light 62. The switch 86 may be a capacitive switch that is a button configured to be pressed by a user when the removable portion 56 is removed from the base portion 54. In this way, the removable portion 56 is configured to function as a flashlight. The switch 86 may be configured such that it is only operable when the removable portion 56 is removed from the base portion 54. Otherwise, the controller 50 controls the light 62.

When the removable portion 56 is connected to the base portion 54, the light 62 is in electronic communication with the controller 50 via the interface 52. In this example, the removable portion 56 includes a conductive element 90 configured to electronically connect to a corresponding element in the base portion 54. The conductive element 90 may be configured to wirelessly electronically connect the removable portion 56 to the base portion 54. The conductive element 90 is configured to transfer power to the battery 88 to charge the battery 88, and to further send and receive instructions between the controller 50 and the various other components of the removable portion 56.

The removable portion 56 may additionally or alternatively include one or more additional electronic components on a printed circuit board (PCB) 92. In the example of FIG. 11, the PCB 92 includes one or more of a locating device, such as a personal locator beacon and/or an avalanche beacon, and/or a wireless repeater, such as a Bluetooth® Low Energy (BLE) repeater or a wireless antenna. The removable portion 56 may also include a chirper 94, which is a type of speaker configured to generate sharp, loud sounds useful for locating purposes. The chirper 94 may be activated manually or automatically, such as when the removable portion 56 is out of range of the vehicle 10.

In the example of FIG. 11, the light 62 is recessed slightly inward from the rear surface 32. In particular, the light 62 is arranged on a PCB 96 relative to an inner optical element 98 and an outer optical element 100. In this example, the inner optical element 98 is a light guide. The outer optical element 100 is a lens and is flush with the rear surface 32. The inner optical element 98 and the outer optical element 100 are arranged and configured to direct light from the light 62 in the rearward direction.

The removable portion 56 may be made at least partially from a plastic material. Specifically, the removable portion 56 may made by overmolding the LED, PCBs, optical elements, and other components of the removable portion 56. To this end the entire tie-down bracket 22 could be overmolded, and in one example includes a steel core. The tie-down bracket 22 may be made at least partially of carbon fiber in some examples.

Figure 12:
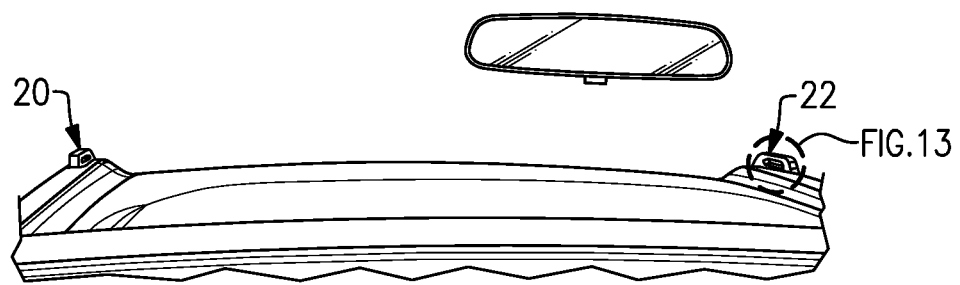
FIG. 12 is a view from an interior of the vehicle of two tie-down brackets.

As generally mentioned above, when the removable portion 56 is attached to the base portion 54, the light 62 of the removable portion 56 is visible from the interior of the vehicle 10 and may be controlled by the controller 50 to indicate various things to a vehicle occupant, such as the driver. FIG. 12 is representative of a view of the first and second tie-down brackets 20, 22 from an interior of the vehicle 10. The rear surfaces of the tie-down brackets 20, 22 are readily visible from the interior of the vehicle.

Figure 13:
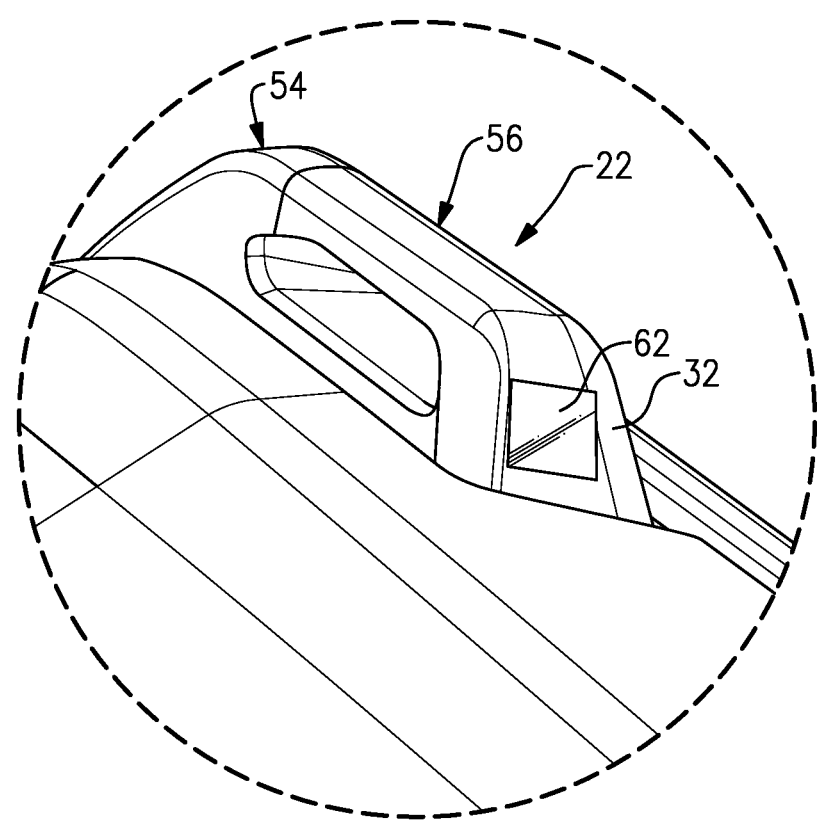
FIG. 13 is a close-up view of the encircled area in FIG. 12.

As shown in FIG. 13, the rear surface 32 of the tie-down bracket 22 includes the light 62. The light 62 is visible from inside the vehicle 10. The light 62 may provide a turn signal indicator, a battery state of charge indicator, a battery charging status indicator (i.e., whether the battery is actively charging or not, or on plug or not), and an auxiliary light (i.e., a low fuel, low oil, low washer fluid, traction control event indicator). While a rear-facing light is shown on the tie-down bracket 22, the tie-down brackets 20, 22 could include other lights, such as forward-facing lights and/or side-facing lights.

It should be understood that terms such as "about," "substantially," and "generally" are not intended to be boundaryless terms, and should be interpreted consistent with the way one skilled in the art would interpret those terms. Further, directional terms such as "superior," "lateral," "medial," "below," "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A vehicle assembly, comprising:
a tie-down bracket including a base portion and a removable portion configured to selectively attach to and detach from the base portion, wherein the removable portion is operable as a flashlight when detached from the base portion, and wherein the tie-down bracket is arranged between a hood of a vehicle and a front quarter panel of the vehicle,
wherein the removable portion includes a first section including a light and a second section including a handle,
wherein a body of the vehicle includes at least one stud,
wherein a groove configured to receive the stud is formed in an end of the first section, and
wherein the stud and groove are arranged such that (1) when the removable portion is rotated out of alignment with the base portion the stud does not restrict vertical movement of the removable portion and (2) when the removable portion is aligned with the base portion the stud restricts vertical movement of the removable portion.

2. The vehicle assembly as recited in claim 1, wherein, when the removable portion is attached to the base portion, the tie-down bracket provides an opening configured to receive a tie-down.

3. The vehicle assembly as recited in claim 2, further comprising a roof rack, and wherein, when the removable portion is attached to the base portion, an item is secured to the roof rack via a tie-down passing through the opening in the tie-down bracket.

4. The vehicle assembly as recited in claim 2, wherein, when the removable portion is attached to the base portion, the removable portion defines a portion of a perimeter of the opening and the base portion defines a remainder of the perimeter of the opening.

5. The vehicle assembly as recited in claim 1, wherein the first section extends in a direction normal to the second section.

6. The vehicle assembly as recited in claim 1, wherein:
the base portion includes an actuator with a selectively moveable pin, and
a recess configured to receive the pin is formed in an end of the second section.

7. The vehicle assembly as recited in claim 1, wherein the handle includes a switch configured to selectively turn the light on and off.

8. The vehicle assembly as recited in claim 1, wherein, when the removable portion is attached to the base portion, the removable portion is electronically connected to the vehicle.

9. The vehicle assembly as recited in claim 8, wherein, when the removable portion is attached to the base portion, a battery of the removable portion is configured to charge.

10. The vehicle assembly as recited in claim 8, wherein, when the removable portion is attached to the base portion, a light of the removable portion faces in a rearward direction and is visible from inside the vehicle.

11. The vehicle assembly as recited in claim 10, wherein the light provides one of a turn signal indicator, a battery state of charge indicator, a battery charging status indicator, and an auxiliary light.

12. The vehicle assembly as recited in claim 1, wherein the removable portion includes one or both of a personal locator beacon and an avalanche beacon.

13. The vehicle assembly as recited in claim 1, wherein the removable portion includes one or both of a wireless repeater and a wireless antenna.

14. The vehicle assembly as recited in claim 1, wherein the removable portion includes a chirper.

15. A method, comprising:
removing a removable portion from a base portion of a tie-down bracket of a vehicle, wherein the tie-down bracket is arranged between a hood of the vehicle and a front quarter panel of the vehicle;

operating the removable portion as a flashlight;

attaching the removable portion to the base portion to define an opening such that the removable portion defines a portion of a perimeter of the opening and the base portion defines a remainder of the perimeter of the opening; and passing a tie-down through the opening.

16. The method as recited in claim 15, wherein, when the removable portion is attached to the base portion, further comprising:

operating a light of the removable portion as one of a turn signal indicator, a battery state of charge indicator, a battery charging status indicator, and an auxiliary light.

17. The method as recited in claim 15, wherein a handle of the removable portion includes a switch, and wherein the step of operating the removable portion as a flashlight includes pressing the switch while the removable portion is removed from the base portion.

18. The method as recited in claim 15, wherein the opening extends through the tie-down bracket in a direction normal to a centerline of the vehicle.

19. A method, comprising:

removing a removable portion from a base portion of a tie-down bracket of a vehicle, wherein the tie-down bracket is arranged between a hood of the vehicle and a front quarter panel of the vehicle;

operating the removable portion as a flashlight;

attaching the removable portion to the base portion to define an opening such that the removable portion defines a portion of a perimeter of the opening and the base portion defines a remainder of the perimeter of the opening; and securing an item to a roof rack of the vehicle via a tie-down passing through the opening in the tie-down bracket.

* * * * *